United States Patent
Xiao (10) Patent No.: US 10,388,022 B2
(45) Date of Patent: *Aug. 20, 2019

(54) IMAGE TARGET TRACKING METHOD AND SYSTEM THEREOF

(71) Applicant: ULSee Inc., Taipei (TW)

(72) Inventor: Jingjing Xiao, Beijing (CN)

(73) Assignee: ULSee Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,119

(22) Filed: Apr. 25, 2017

(65) Prior Publication Data

US 2018/0053307 A1   Feb. 22, 2018

(30) Foreign Application Priority Data

Aug. 22, 2016 (CN) .......................... 2016 1 0701023

(51) Int. Cl.
*G06T 7/194* (2017.01)
*G06T 7/246* (2017.01)

(52) U.S. Cl.
CPC .............. *G06T 7/194* (2017.01); *G06T 7/246* (2017.01); *G06T 2207/10016* (2013.01); *G06T 2207/10024* (2013.01)

(58) Field of Classification Search
CPC . G06T 2207/10016; G06T 2207/30241; G06T 7/194; G06T 7/246; G06T 2207/20076; G06T 2207/30212; G06T 2207/30232; G06T 7/248; G06T 7/75; G06K 9/00771; G06K 9/4604; G06K 9/6212
See application file for complete search history.

(56) References Cited

U.S. PATENT DOCUMENTS

| | | | |
|---|---|---|---|
| 8,121,346 B2 * | 2/2012 | Williams | G06K 9/6255 348/169 |
| 8,730,246 B2 * | 5/2014 | Girard | G06T 13/40 345/474 |
| 9,008,840 B1 | 4/2015 | Ponulak et al. | |
| 9,052,386 B2 | 6/2015 | Yeredor et al. | |
| 9,213,901 B2 * | 12/2015 | Bernal | G06K 9/00771 |
| 9,269,012 B2 | 2/2016 | Fotland | |
| 9,767,378 B2 * | 9/2017 | Rastgar | G06K 9/52 |

(Continued)

*Primary Examiner* — Jingge Wu
(74) *Attorney, Agent, or Firm* — Alan D. Kamrath; Mayer & Williams PC (57) ABSTRACT

An image target tracking method and system thereof are provided in the present disclosure. The image target tracking method includes the following steps: obtaining a target initial position, and performing a sparse sampling according to the target initial position; dividing sampling points into foreground sampling points and background sampling points; clustering adjacent foreground sampling points according to a spatial distribution of the foreground sampling points in order to obtain a clustering result containing a plurality of clusters; performing a robust estimation according to the clustering result in order to determine a relative position between a target and a camouflage interference in an image; and generating a prediction trajectory, correlating an observation sample position with the prediction trajectory to generate a correlation result, and determining whether the target is blocked and tracking the target according to the correlation result.

8 Claims, 6 Drawing Sheets

(56) References Cited

U.S. PATENT DOCUMENTS

| | | |
|---|---|---|
| 9,898,682 B1 * | 2/2018 | Sieracki .................. G06T 7/246 |
| 2008/0154154 A1 | 6/2008 | Sarvazyan et al. |
| 2014/0092253 A1 * | 4/2014 | Marty ................ A63B 69/0071 |
| | | 348/157 |
| 2015/0221096 A1 * | 8/2015 | Gefen ..................... G06T 7/292 |
| | | 382/103 |
| 2016/0239982 A1 * | 8/2016 | Li ............................ G06K 9/66 |

* cited by examiner

IMAGE TARGET TRACKING METHOD AND SYSTEM THEREOF

FIELD OF THE DISCLOSURE

The present disclosure relates to an image processing technology, and more particularly to an image target tracking method and system thereof.

BACKGROUND OF THE INVENTION

With the application of video cameras in the field of urban security, image-information-based target tracking algorithms attract research enthusiasm of industry and academia. In the past three decades, the image tracking algorithm has made great progress. However, there are still many open problems that do not have perfect solutions, such as, large deformation of the target, change of viewing angles, change of lights, noisy background, interference, shelters, and other issues.

A traditional target tracking scheme is based on modeling of the target object completion algorithm, which mainly include three parts: 1) an extraction of the target feature model; 2) a multi-feature fusion model matching algorithm; and 3) a real-time update scheme of the algorithm.

Based on the traditional target tracking scheme, a tracker can deal with some traditional problems, such as large deformation of the target, change of lights and rapid movement. However, when a camouflage is existed in the environment, the image target cannot be well tracked since the image target is blocked. For example, in the crowd, when the tracking object (pedestrian) is blocked, the traditional image target tracking scheme may erroneously track other pedestrians.

Hence, how to improve the image target tracking scheme has become an important topic for the person skilled in the art.

SUMMARY OF THE INVENTION

Based on this, in connection with the problem that a traditional image target tracking scheme cannot achieve accurate tracking, it is necessary to provide an image target tracking method and system thereof which can accurately track a target.

It is one objective of the present disclosure to provide an image target tracking method.

According to one exemplary embodiment of the present disclosure, an image target tracking method is provided. The image target tracking method includes the following steps: obtaining a target initial position, and performing a sparse sampling according to the target initial position; dividing sampling points into foreground sampling points and background sampling points; clustering adjacent foreground sampling points according to a spatial distribution of the foreground sampling points in order to obtain a clustering result containing a plurality of clusters; performing a robust estimation according to the clustering result in order to determine a relative position between a target and a camouflage interference in an image; and generating a prediction trajectory, correlating an observation sample position with the prediction trajectory to generate a correlation result, and determining whether the target is blocked and tracking the target according to the correlation result.

It is one objective of the present disclosure to provide an image target tracking system.

According to one exemplary embodiment of the present disclosure, an image target tracking system is provided. The image target tracking system is applied to the abovementioned image target tracking method. The image target tracking system includes a sparse sampling module, a sampling point dividing module, a clustering module, a position determining module, and a tracking module. The sparse sampling module is configured to obtain a target initial position, and perform a sparse sampling according to the target initial position. The sampling point dividing module is configured to divide sampling points into foreground sampling points and background sampling points. The clustering module is configured to cluster adjacent foreground sampling points according to a spatial distribution of the foreground sampling points in order to obtain a clustering result containing a plurality of clusters. The position determining module is configured to perform a robust estimation according to the clustering result in order to determine a relative position between a target and a camouflage interference in an image. The tracking module is configured to generate a prediction trajectory, correlate an observation sample position with the prediction trajectory to generate a correlation result, and determine whether the target is blocked and track the target according to the correlation result.

The image target tracking method and system thereof provided in the present disclosure may obtain a target initial position, and perform a sparse sampling according to the target initial position; divide sampling points into foreground sampling points and background sampling points; cluster adjacent foreground sampling points according to a spatial distribution of the foreground sampling points in order to obtain a clustering result containing a plurality of clusters; perform a robust estimation according to the clustering result in order to determine a relative position between a target and a camouflage interference in an image; and generate a prediction trajectory, correlate an observation sample position with the prediction trajectory to generate a correlation result, and determine whether the target is blocked and track the target according to the correlation result. Throughout the process, a multi-feature cascade clustering is completed by using sparse sampling, sampling point division, and adjacent foreground sampling point clustering; a robust estimation is performed in order to accurately predict a relative position between a target and a camouflage interference; and finally the prediction trajectory is correlated to determine whether the target is blocked and to accurately track the target.

These and other objectives of the present disclosure will no doubt become obvious to those of ordinary skill in the art after reading the following detailed description of the preferred embodiment that is illustrated in the various figures and drawings.

DESCRIPTION OF THE PREFERRED EMBODIMENTS

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Figure 1:
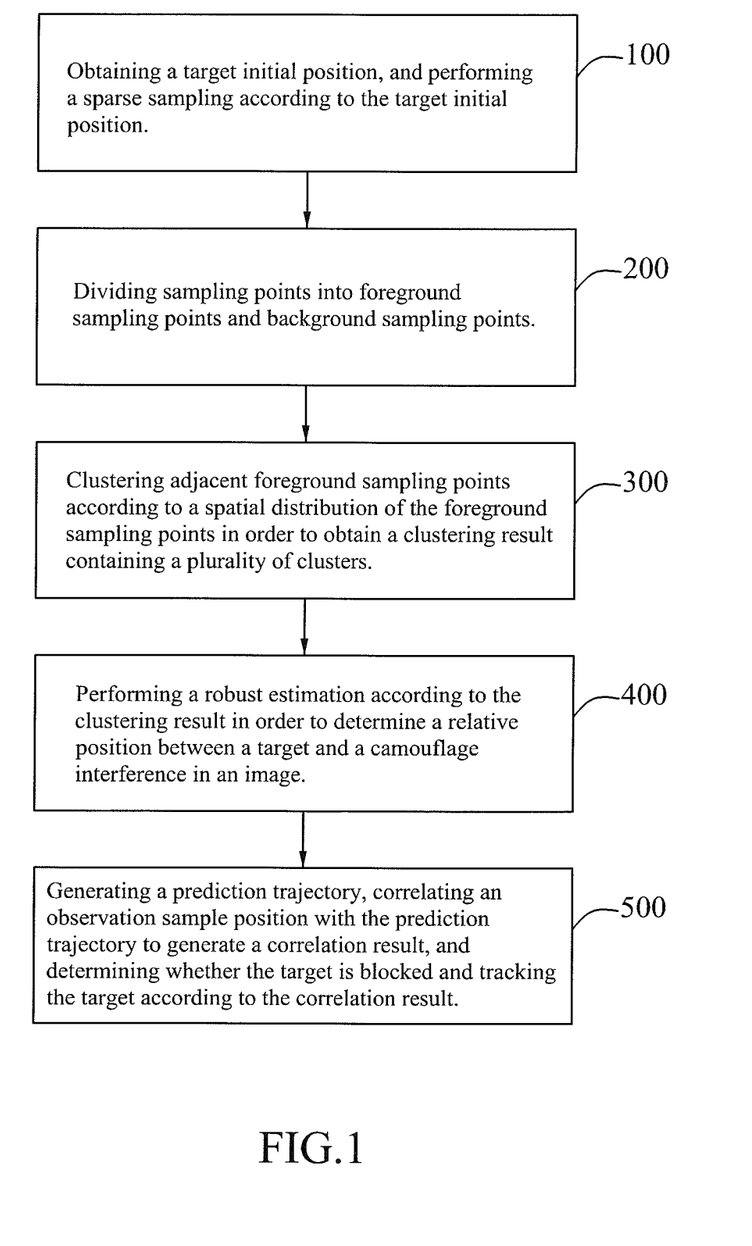
FIG. 1 is a flowchart illustrating the procedures of an image target tracking method according to a first embodiment of the present disclosure.

Please refer to FIG. 1. FIG. 1 is a flowchart illustrating the procedures of an image target tracking method according to a first embodiment of the present disclosure. As shown in FIG. 1, the method may include the following steps S100, S200, S300, S400, and S500.

S100: Obtaining a target initial position, and performing a sparse sampling according to the target initial position.

An image containing the target is extracted in order to acquire the target initial position. The methods for acquiring the target initial position are different in different application scenarios. In particular, they can be divided into two cases: a first case is that a previous frame image is existed, and a second case is that a previous frame image is absent. For the first case that a previous frame image is existed, the target initial position can be acquired directly by acquiring the position of the target in the previous frame image. For the second case that a previous frame image is absent, the target initial position can be acquired by acquiring a target predetermined position. The details will be illustrated by the following example. Assuming that continuous images containing the target have been collected before the current time point (for example, the frame image collected at the current time point is a $10^{th}$ frame image from the beginning of acquisition), the target initial position can be acquired from the collected $9^{th}$ frame image containing the target. Assuming that continuous images containing the target have not been collected before the current time point, (i.e., the frame image collected at the current time point is a $1^{st}$ frame image from the beginning of acquisition), the target initial position can be acquired by acquiring the target predetermined position. In one embodiment, the target predetermined position can be set randomly or based on actual application scenarios and historical experience data. A spare sampling may be performed around the target initial position based on the target initial position to acquire a plurality of sampling points. In another embodiment, an uniform sparse sampling may be performed around the target initial position in order to acquire a plurality of more neat sampling points, which is beneficial to reduce the load of post-data processing.

S200: Dividing sampling points into foreground sampling points and background sampling points.

The sampling points acquired in Step 100 are divided into foreground sampling points and background sampling points, wherein the foreground sampling points may contain the target, and may also contain the camouflage interference. In another embodiment, the step S200 may include the following steps.

Step 1: Color features of each sampling point in the sparse samples are extracted. After the sparse sampling in Step 100 is performed, a plurality of sampling points will be acquired, and the color features in each sampling point are extracted. Specially, the histogram of color feature of each sampling point is extracted.

Step 2: Obtaining the gradient histogram feature of color intensity, and matching the extracted color feature with the gradient histogram feature of color intensity in order to obtain a matching result. The gradient histogram feature of color intensity is the feature extracted by dividing the existing image target feature, wherein the gradient model is a histogram of oriented gradient (HOG). In one embodiment, the color feature extracted in the sampling point can be matched with the color feature in the model by using a Bhattacharyya distance calculation method, wherein one matching value can be obtained from each sampling point.

Step 3: Based on the matching result and the spatial position information of the sampling points, the sampling points can be divided into foreground sampling points and background sampling points by using Gaussian clustering algorithm. The clustering algorithm is a statistical analysis method for researching (sample or index) classification problem, and it is also an important algorithm for data mining. The clustering analysis is composed of several models, wherein usually a model is a vector of a measure or a point in a multidimensional space. The clustering analysis is based on similarity. There is more similarity between models in a same cluster than between models in different clusters. In one embodiment, based on the color matching result and the spatial position information of each sampling point, the sampling points are divided into foreground sampling points and background sampling points by using Gaussian clustering algorithm. The foreground sampling points may contain the target, and may also contain the camouflage interference. In the follow-up operations, the foreground sampling points are mainly processed.

S300: Clustering adjacent foreground sampling points according to a spatial distribution of the foreground sampling points in order to obtain a clustering result containing a plurality of clusters.

After the sampling points are divided into foreground sampling points and background sampling points, all foreground sampling points are traversed. Adjacent foreground sampling points are re-clustered according to the spatial distribution of the foreground sampling points in order to obtain the clustering result containing a plurality of clusters. In one embodiment, overlapping regions of the foreground sampling points in the spatial distribution can be mainly considered. The overlapping region is re-clustered in order to obtain the clustering result containing a plurality of clusters. Specifically, in on embodiment, the step S300 may include the following steps.

Step 1: The overlapping region of foreground sampling points is obtained according to the spatial distribution of the foreground sampling points. After the foreground sampling points and the background sampling points are distinguished, all foreground sampling points are traversed for analyzing the spatial distribution of the foreground sampling points in order to find the overlapping region of the foreground sampling points.

Step 2: The foreground sampling points are clustered according to the overlapping region of the foreground sampling points in order to obtain the clustering result containing a plurality of clusters. A spatial clustering is performed on the foreground sampling points having the overlapping region again, and the foreground sampling points are divided into multiple different clusters according to the spatial distribution.

S400: Performing a robust estimation according to the clustering result in order to determine a relative position between a target and a camouflage interference in an image.

A robust estimation is performed according to the clustering result in order to determine the relative position between the target and the camouflage interference in the image.

Figure 2A:
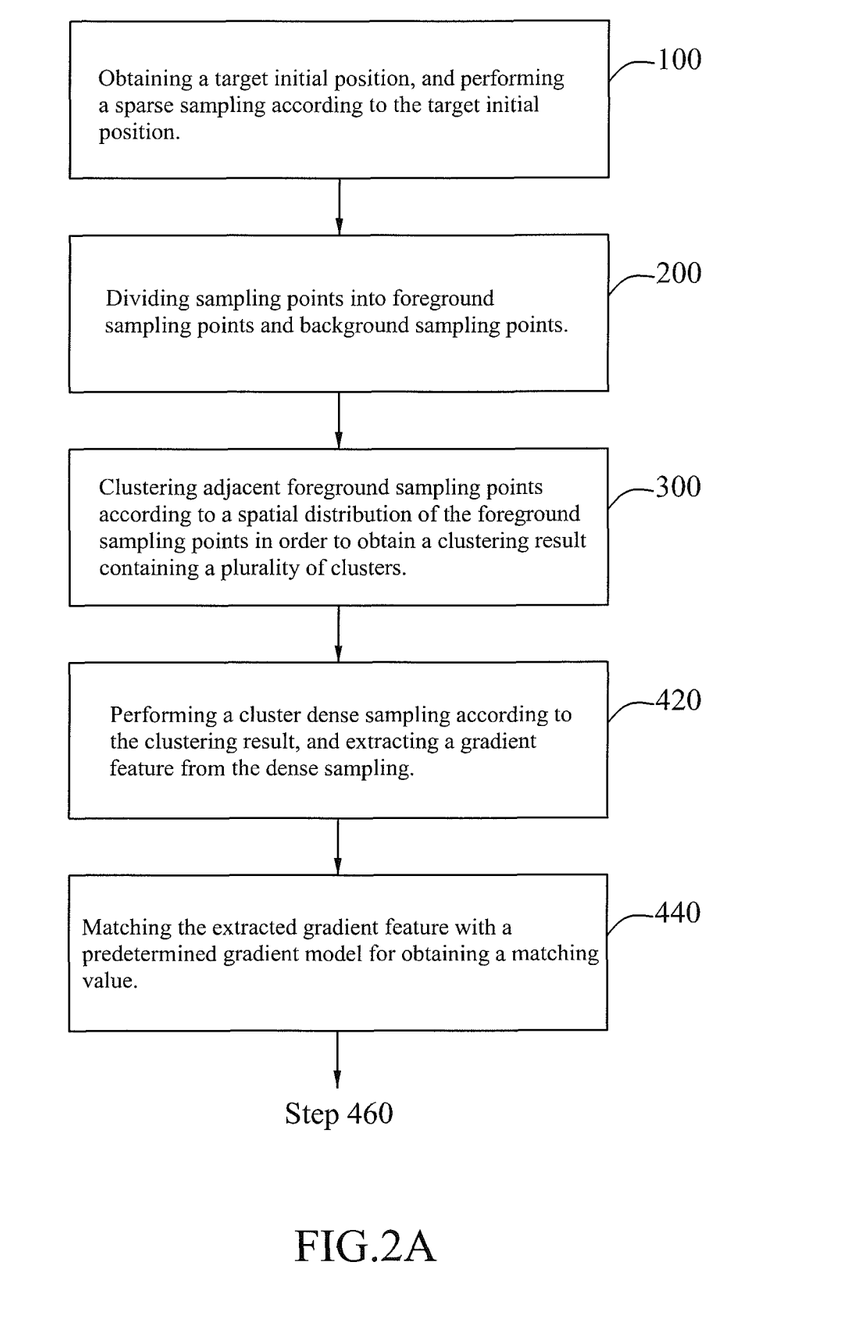
FIG. 2A and FIG. 2B are a flowchart illustrating the procedures of an image target tracking method according to a second embodiment of the present disclosure.
Figure 2B:
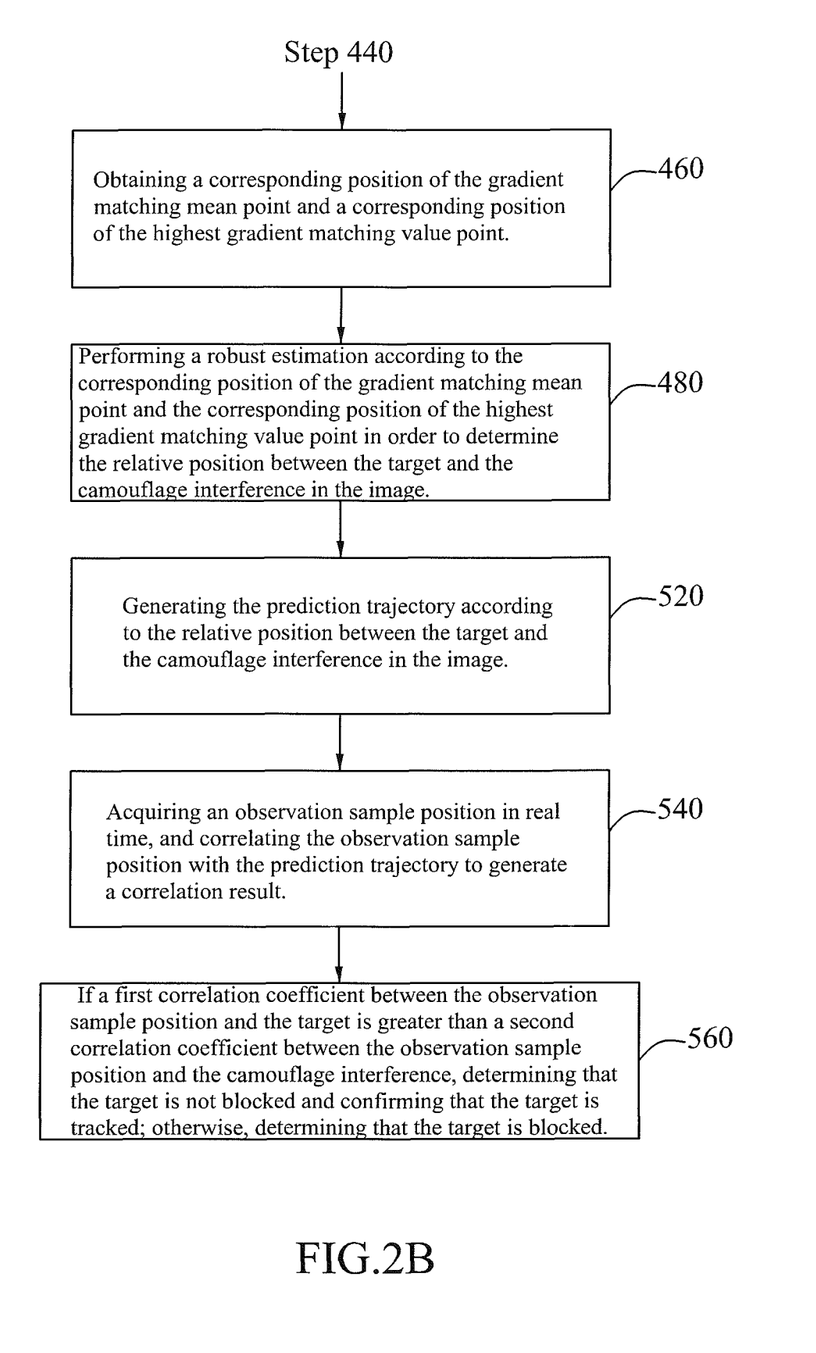

Please refer to FIG. 2A and FIG. 2B. FIG. 2A AND FIG. 2B are a flowchart illustrating the procedures of an image target tracking method according to a second embodiment of the present disclosure. As shown in FIG. 2A AND FIG. 2B, in one embodiment, the step S400 further includes the following steps S420, S440, S460, and S480.

S420: Performing a cluster dense sampling according to the clustering result, and extracting a gradient feature from the dense sampling.

S440: Matching the extracted gradient feature with a predetermined gradient model for obtaining a matching value.

The predetermined gradient module is a pre-built model. In particular, the gradient model is a histogram of oriented gradient (HOG), which can be obtained by modeling experience data of the image target. In the matching process, the matching value is adopted for representing a matching degree between the two.

S460: Obtaining a corresponding position of the gradient matching mean point and a corresponding position of the highest gradient matching value point.

For the matching value, the gradient matching mean point and the highest gradient matching value point are focused, and a corresponding position of the gradient matching mean point and a corresponding position of the highest gradient matching value point are obtained, respectively.

S480: Performing a robust estimation according to the corresponding position of the gradient matching mean point and the corresponding position of the highest gradient matching value point in order to determine the relative position between the target and the camouflage interference in the image.

Since each cluster may contain one or more (two) targets, in order to effectively estimating the positions of all targets and camouflage interference, a robust estimation is completed by adopting the corresponding position of the gradient matching mean point and the corresponding position of the highest gradient matching value point for determining the relative position between the target(s) and the camouflage interference.

In one embodiment, the step S480 includes the following steps.

Step 1: Performing an iterative clustering and a potential target region estimation on dense sampling points within each cluster according to the corresponding position of the gradient matching mean point and the corresponding position of the highest gradient matching value point.

Step 2: When an offset between the corresponding position of each gradient matching mean point and the corresponding position of each highest gradient matching value point is less than a predetermined value, stopping the iteration and searching a target having the overlapping region.

Step 3: Determining the relative position between the target and the camouflage interference in the image.

The corresponding position of the gradient matching mean point is obtained according to the matching value. An iterative clustering and a target region estimation are performed on dense sampling points within each cluster according to the corresponding position of the highest gradient matching value point. The iteration is stopped until that the corresponding position of the gradient matching mean point is close enough to the corresponding position of the highest gradient matching value point. The estimation of the target position is completed by using the relative position between the target and the camouflage interference in the image. In practice, the corresponding position of the gradient matching mean point is close enough to the corresponding position of the highest gradient matching value point can be implemented by setting that an offset between the corresponding position of each gradient matching mean point and the corresponding position of each highest gradient matching value point is less than a predetermined value. More specifically, the predetermined value is 50%, that is, when the offset between the corresponding position of each gradient matching mean point and the corresponding position of each highest gradient matching value point is less than 50%, the iteration is stopped, and the target having the overlapping region is searched.

S500: Generating a prediction trajectory, correlating an observation sample position with the prediction trajectory to generate a correlation result, and determining whether the target is blocked and tracking the target according to the correlation result.

Based on the relative position between the target and the camouflage interference in the image determined in the step S400, the prediction trajectory is generated, and the observation sample position acquired in real time can be correlated with the prediction trajectory to obtain a correlation result. Whether the target is blocked is determined according to the correlation result in order to accurately track the target. In particular, the target position can be predicted by using the relative position between the target and the camouflage interference, and then the observation sample position is correlated with the prediction trajectory. If the appropriate correlation object (the target) is not found, determining that the target is blocked; and if the appropriate correlation object (the target) is found, the target is tracked.

As shown in FIG. 2A AND FIG. 2B, in one embodiment, the step S500 further includes the following steps S520, S540, and S560.

S520: Generating the prediction trajectory according to the relative position between the target and the camouflage interference in the image.

The trajectory can be fitted based on the relative position between the target and the camouflage interference in the image combined with the historical information, and a global dynamic constraint is performed on the target position prediction for generating a prediction trajectory. Specially, the historical information may include a historical image position of the target, a number of camouflage targets, a historical image position of the camouflage interference, and the relative position thereof. The prediction trajectory may include a target prediction trajectory and a camouflage interference prediction trajectory.

S540: Acquiring an observation sample position in real time, and correlating the observation sample position with the prediction trajectory to generate a correlation result.

Performing an observation on the entire image with the camouflage interference in order to acquire an observation sample position in real time, and the observation sample position is correlated with the prediction trajectory to generate a correlation result. In practice, there may be many observation sample position. I order to better determine whether the target I blocked and track the target, a filtering may be performed on the observation sample positions.

In one embodiment, the step S540 may further include the following steps.

Step 1: Separately matching the observation sample position with the target trajectory and the camouflage interference trajectory through a Bayesian probability algorithm.

Step 2: Calculating an observation weight value corresponding to the observation sample position, wherein the higher the observation weight value when the observation sample position is more similar to the target trajectory, and the lower the observation weight value when the observation sample position is more similar to the camouflage interference trajectory.

Step 3: Selecting the observation sample position having a highest observation weight value to be correlated with the prediction trajectory.

By adopting the abovementioned method, the most similar observation sample position can be selected to be correlated with the prediction trajectory, and finally the target can be tracked more accurately.

S560: If a first correlation coefficient between the observation sample position and the target is greater than a second correlation coefficient between the observation sample position and the camouflage interference, determining that the target is not blocked and confirming that the target is tracked; otherwise, determining that the target is blocked.

If a first correlation coefficient between the observation sample position and the target is greater than a second correlation coefficient between the observation sample position and the camouflage interference, determining that the target is not blocked and confirming that the target is tracked. Otherwise, the existing observation samples are all identified as the camouflage interference, and the target is determined to be blocked by the camouflage interference.

The image target tracking method provided in the present disclosure may obtain a target initial position, and perform a sparse sampling according to the target initial position; divide sampling points into foreground sampling points and background sampling points; cluster adjacent foreground sampling points according to a spatial distribution of the foreground sampling points in order to obtain a clustering result containing a plurality of clusters; perform a robust estimation according to the clustering result in order to determine a relative position between a target and a camouflage interference in an image; and generate a prediction trajectory, correlate an observation sample position with the prediction trajectory to generate a correlation result, and determine whether the target is blocked and track the target according to the correlation result. Throughout the process, a multi-feature cascade clustering is completed by using sparse sampling, sampling point division, and adjacent foreground sampling point clustering; a robust estimation is performed in order to accurately predict a relative position between a target and a camouflage interference; and finally the prediction trajectory is correlated to determine whether the target is blocked and to accurately track the target.

Figure 3:
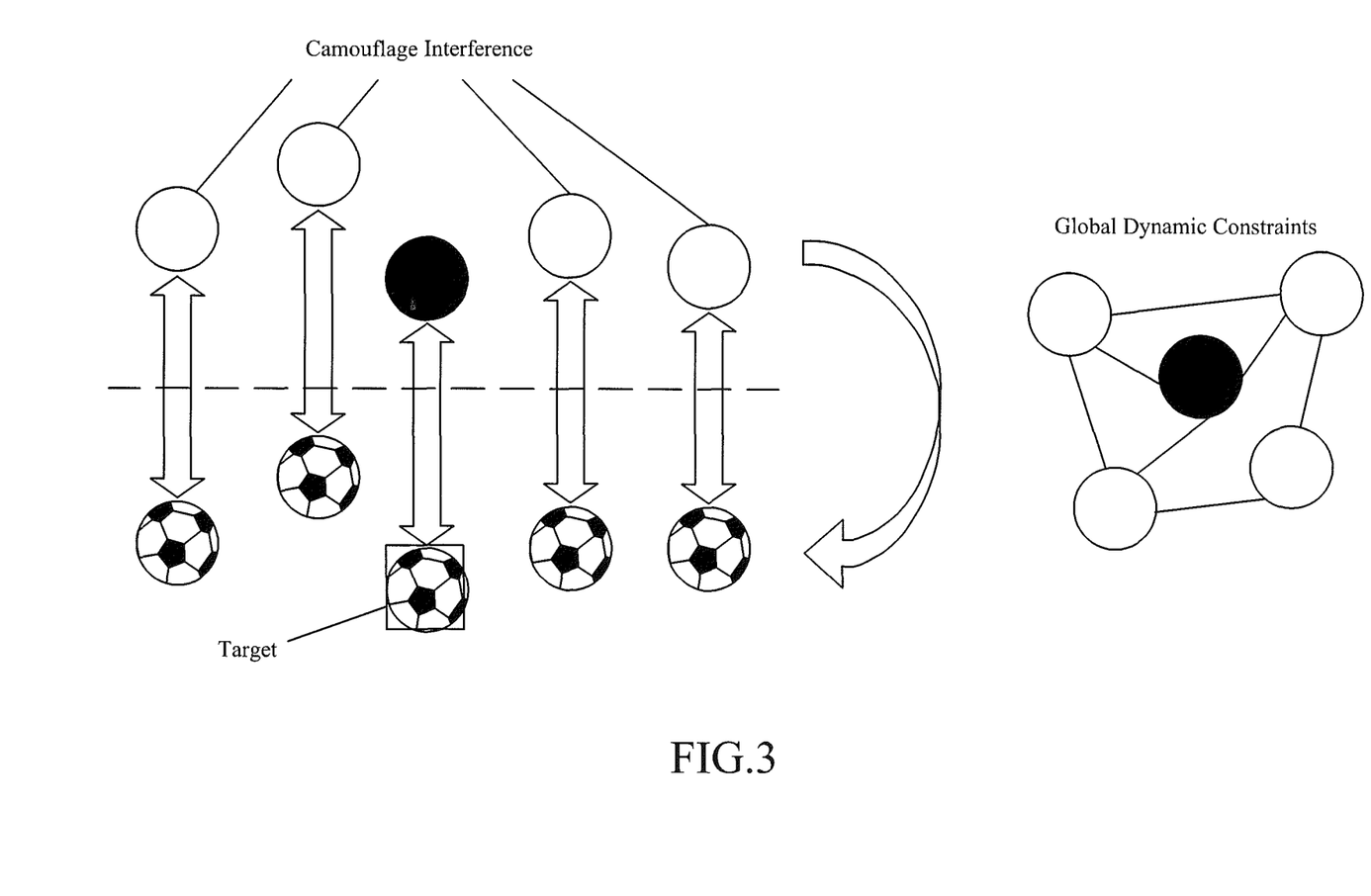
FIG. 3 is diagram showing a Target Correlation Algorithm under global dynamic constraints.

In order to further explain the technical scheme of the image target tracking method of the present invention in detail, a concrete example combined with FIG. 3 will be described below for describing the overall technical scheme and advantageous effects thereof.

Step 1: Performing an uniform sparse sampling around a target based on a previous frame target position, and extracting a color feature (histogram) from each sampling.

Step 2: Matching the color feature extracted from each sampling with a color feature in a model by using a Bhattacharyya distance calculation algorithm, wherein each sampling will obtain a corresponding matching value.

Step 3: Dividing the sampling points into foreground sampling points and background sampling points according to a color matching value of the sampling point and its spatial position information by using Gaussian clustering algorithm, wherein the foreground sampling points may contain the target and may simultaneously contain the camouflage interference.

Step 4: Performing a spatial clustering on the foreground sampling points having the overlapping region again, and the foreground sampling points are divided into multiple different clusters according to the spatial distribution.

Step 5: In order to improve the accuracy, a dense sampling is performed in each cluster, and a gradient feature is extracted from the dense samples.

Step 6: Matching the gradient feature of the sampling point with a predetermined gradient model for obtaining a matching value.

Step 7: Since each cluster may contain one or more (two) targets, in order to effectively estimate the positions of all targets and the camouflage interference, the algorithm iteratively calculates a corresponding position of a gradient matching mean point and a corresponding position of a highest gradient matching value point in the cluster to complete the robust estimation. The iteration is stopped until that the corresponding position of the gradient matching mean point is close enough to the corresponding position of the highest gradient matching value point, that is, an offset between the corresponding position of each gradient matching mean point and the corresponding position of each highest gradient matching value point is less than 50%.

Step 8: Determining the target having overlapping regions according to the iteration result, so as to determine the relative position between the target and the camouflage interference in the image.

Step 9: As shown in FIG. 3, the trajectory can be fitted based on the relative position between the target and the camouflage interference in the image combined with the historical information, and a prediction of the target position is completed to form a global dynamic constraint.

Step 10: Correlating the observation sample position with the prediction trajectory. If a first correlation coefficient between the observation sample position and the target is greater than a second correlation coefficient between the observation sample position and the camouflage interference, determining that the target is not blocked and confirming that the target is tracked. Otherwise, the existing observation samples are all identified as the camouflage interference, and the target is determined to be blocked by the camouflage interference.

The image target tracking method provided in the present disclosure may perform an uniform sparse sampling around a target based on a previous frame target position, and extract a color feature (histogram) from each sampling; may match the color feature extracted from each sampling with a color feature in a model; may divide the sampling points into foreground sampling points and background sampling points according to a color matching value of the sampling point and its spatial position information by using Gaussian clustering algorithm; may perform a spatial clustering on the foreground sampling points having the overlapping region again; may perform a dense sampling in each cluster, and extract a gradient feature from the dense samples; may match the gradient feature of the sampling point with a predetermined gradient model for obtaining a matching value; may obtain a corresponding position of a gradient matching mean point in the dese sampling according to the gradient matching value; may iteratively compare the corresponding position of the highest gradient matching value point and the corresponding position of the gradient matching mean point; may perform an iterative clustering on the dense sampling within each cluster; may complete potential target region estimation; and may stop the iteration until that the corresponding position of the gradient matching mean point is close enough to the corresponding position of the highest gradient matching value point, that is, an offset between the corresponding position of each gradient matching mean point and the corresponding position of each highest gradient matching value point is less than 50%. At this stage, this algorithm completes prediction of the relative position between the target and the camouflage interference. After that, the trajectory can be fitted based on the relative position between the target and the camouflage interference in the image combined with the historical information, and a prediction of the target position is completed to form a global dynamic constraint. The observation sample position is correlated with the prediction trajectory. If a first correlation coefficient between the observation sample position and the target is greater than a second correlation coefficient between the observation sample position and the camouflage interference, determining that the target is not blocked and confirming that the target is tracked. Otherwise, the existing observation samples are all identified as the camouflage interference, and the target is determined to be blocked by the camouflage interference.

Figure 4:
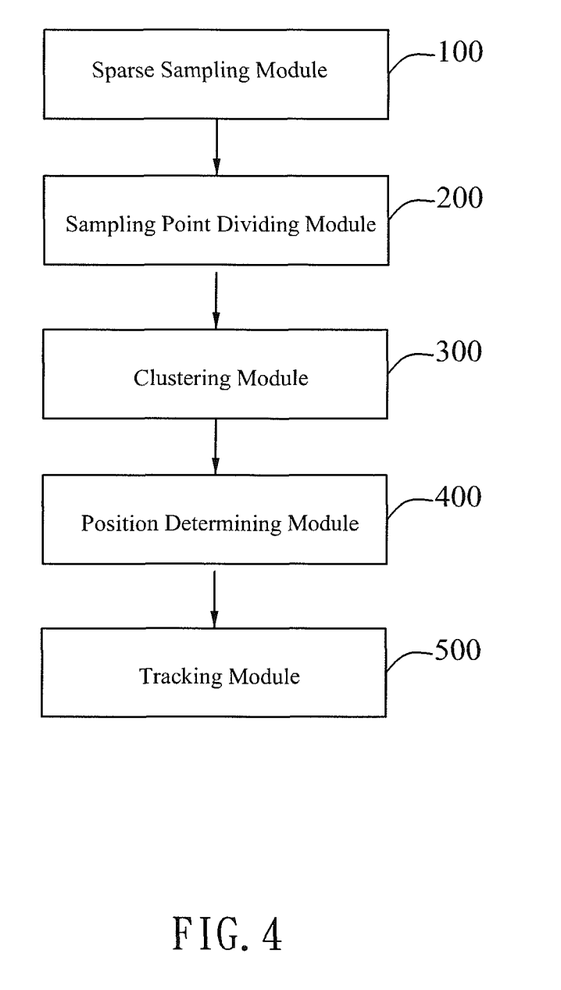
FIG. 4 is a block diagram of an image target tracking system according to a first embodiment of the present disclosure.

Please refer to FIG. 4. FIG. 4 is a block diagram of an image target tracking system according to a first embodiment of the present disclosure. As shown in FIG. 4, the image target tracking system includes a sparse sampling module 100, a sampling point dividing module 200, a clustering module 300, a position determining module 400, and a tracking module 500.

The sparse sampling module 100 is configured to obtain a target initial position, and perform a sparse sampling according to the target initial position.

The sampling point dividing module 200 is configured to divide sampling points into foreground sampling points and background sampling points.

The a clustering module 300 is configured to cluster adjacent foreground sampling points according to a spatial distribution of the foreground sampling points in order to obtain a clustering result containing a plurality of clusters.

The position determining module 400 is configured to perform a robust estimation according to the clustering result in order to determine a relative position between a target and a camouflage interference in an image.

The tracking module 500 is configured to generate a prediction trajectory, correlate an observation sample position with the prediction trajectory to generate a correlation result, and determine whether the target is blocked and track the target according to the correlation result.

The image target tracking system of the present disclosure uses the sparse sampling module 100 to obtain a target initial position and perform a sparse sampling according to the target initial position; uses the sampling point dividing module 200 to divide sampling points into foreground sampling points and background sampling points; uses the clustering module 300 to cluster adjacent foreground sampling points according to a spatial distribution of the foreground sampling points in order to obtain a clustering result containing a plurality of clusters; uses the position determining module 400 to perform a robust estimation according to the clustering result in order to determine a relative position between a target and a camouflage interference in an image; and uses the tracking module 500 to generate a prediction trajectory, correlate an observation sample position with the prediction trajectory to generate a correlation result, and determine whether the target is blocked and track the target according to the correlation result. Throughout the process, a multi-feature cascade clustering is completed by using sparse sampling, sampling point division, and adjacent foreground sampling point clustering; a robust estimation is performed in order to accurately predict a relative position between a target and a camouflage interference; and finally the prediction trajectory is correlated to determine whether the target is blocked and to accurately track the target.

Figure 5:
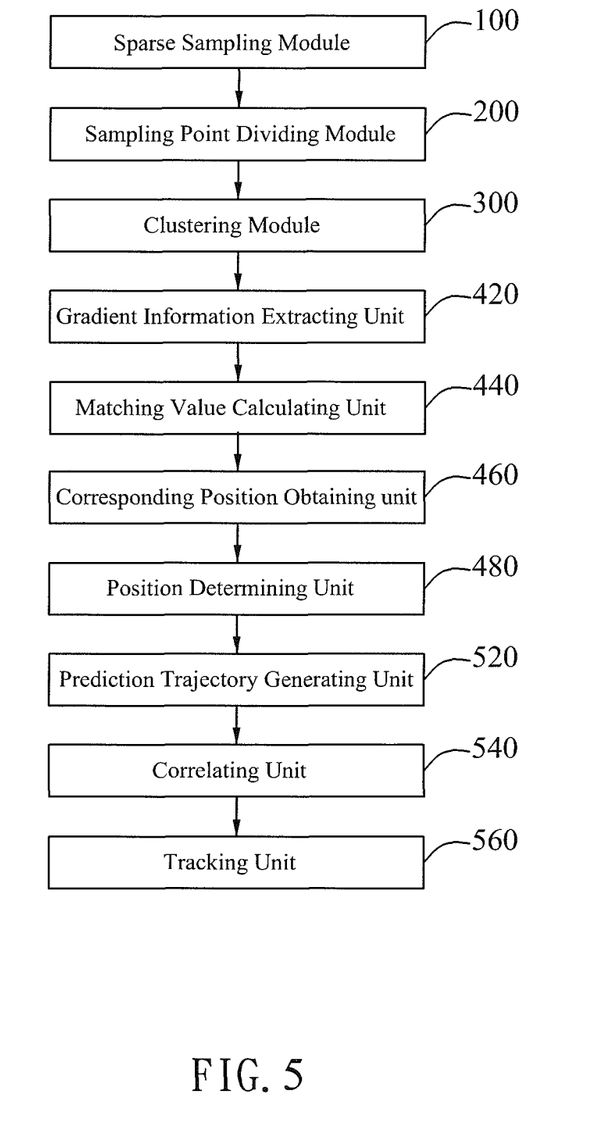
FIG. 5 is a block diagram of an image target tracking system according to a second embodiment of the present disclosure.

Please refer to FIG. 5. FIG. 5 is a block diagram of an image target tracking system according to a second embodiment of the present disclosure. As shown in FIG. 5, in one example, the tracking module 500 further includes a prediction trajectory generating unit 520, a correlating unit 540, and a tracking unit 540.

The prediction trajectory generating unit 520 is configured to generate the prediction trajectory according to the relative position between the target and the camouflage interference in the image.

The correlating unit 540 is configured to acquire an observation sample position in real time, and correlate the observation sample position with the prediction trajectory to generate a correlation result.

The tracking unit 560 is configured to determine that the target is not blocked and confirm that the target is tracked If a first correlation coefficient between the observation sample position and the target is greater than a second correlation coefficient between the observation sample position and the camouflage interference; otherwise, the tracking unit is configured to determine that the target is blocked.

In one example, the prediction trajectory includes a target trajectory and a camouflage interference trajectory; and the correlation unit 560 further includes a matching unit, an observation weight calculating unit, and a correlation executing unit.

The matching unit is configured to separately match the observation sample position with the target trajectory and the camouflage interference trajectory through a Bayesian probability algorithm.

The observation weight calculating unit is configured to calculate an observation weight value corresponding to the observation sample position, wherein the higher the observation weight value when the observation sample position is more similar to the target trajectory, and the lower the observation weight value when the observation sample position is more similar to the camouflage interference trajectory.

The correlation executing unit is configured to select the observation sample position having a highest observation weight value to be correlated with the prediction trajectory.

As shown in FIG. 5, in one embodiment, the position determining module 400 further includes a gradient information extracting unit 420, a matching value calculating unit 440, a corresponding position obtaining unit 460, and a position determining unit 480.

The gradient information extracting unit 420 is configured to perform a cluster dense sampling according to the clustering result, and extract a gradient feature from the dense sampling.

The matching value calculating unit 440 is configured to match the extracted gradient feature with a predetermined gradient model for obtaining a matching value.

The corresponding position obtaining unit 460 is configured to obtain a corresponding position of the gradient matching mean point and a corresponding position of the highest gradient matching value point.

The position determining unit 480 is configured to perform a robust estimation according to the corresponding position of the gradient matching mean point and the corresponding position of the highest gradient matching value point in order to determine the relative position between the target and the camouflage interference in the image.

In one example, the position determining unit 480 further includes an iteration matching value calculating unit, an overlapping region searching unit, and a determining unit.

The iteration matching value calculating unit is configured to perform an iterative clustering and a potential target region estimation on dense sampling points within each cluster according to the corresponding position of the gradient matching mean point and the corresponding position of the highest gradient matching value point.

The overlapping region searching unit is configured to stop the iteration and search a target having the overlapping region when an offset between the corresponding position of each gradient matching mean point and the corresponding position of each highest gradient matching value point is less than a predetermined value.

The determining unit is configured to determine the relative position between the target and the camouflage interference in the image.

In one example, the sampling point dividing module 200 further includes a color feature extracting unit, a matching unit, and a dividing unit.

The color feature extracting unit is configured to extracting color features in each sampling point of the sparse sampling.

The matching unit is configured to obtain the gradient histogram feature of color intensity, and match the extracted color feature with the gradient histogram feature of color intensity in order to obtain a matching result.

The dividing unit is configured to divide the sampling points into foreground sampling points and background sampling points by using Gaussian clustering algorithm based on the matching result and the spatial position information of the sampling points.

In one example, the clustering module 300 further includes an overlapping region obtaining unit and a clustering unit.

The overlapping region obtaining unit is configured to obtain overlapping region of foreground sampling points according to the spatial distribution of the foreground sampling points.

The clustering unit is configured to cluster the foreground sampling points according to the overlapping region of the foreground sampling points in order to obtain the clustering result containing a plurality of clusters.

Reference in the specification to "one example" or "an example" means that a particular feature, structure, or characteristic described in connection with the example is included in at least an implementation. The appearances of the phrase "in one example" in various places in the specification are not necessarily all referring to the same example. Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The above are only preferred examples of the present disclosure is not intended to limit the present disclosure within the spirit and principles of the present disclosure, any changes made, equivalent replacement, or improvement in the protection of the present disclosure should contain within the range.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image target tracking method, comprising:
obtaining a target initial position, and performing a sparse sampling according to the target initial position;
dividing sampling points into foreground sampling points and background sampling points;
clustering adjacent foreground sampling points according to a spatial distribution of the foreground sampling points in order to obtain a clustering result containing a plurality of clusters;
performing a robust estimation according to the clustering result in order to determine a relative position between a target and a camouflage interference in an image; and
generating a prediction trajectory, correlating an observation sample position with the prediction trajectory to generate a correlation result, and determining whether the target is blocked and tracking the target according to the correlation result;
wherein the step of generating a prediction trajectory, correlating an observation sample position with the prediction trajectory to generate a correlation result, and determining whether the target is blocked and tracking the target according to the correlation result comprises:
generating the prediction trajectory according to the relative position between the target and the camouflage interference in the image;
acquiring an observation sample position in real time, and correlating the observation sample position with the prediction trajectory to generate a correlation result; and
if a first correlation coefficient between the observation sample position and the target is greater than a second correlation coefficient between the observation sample position and the camouflage interference, determining that the target is not blocked and confirming that the target is tracked; otherwise, determining that the target is blocked.

2. The image target tracking method according to claim 1, wherein the prediction trajectory comprises a target trajectory and a camouflage interference trajectory; and the step of correlating the observation sample position with the prediction trajectory comprises:

separately matching the observation sample position with the target trajectory and the camouflage interference trajectory through a Bayesian probability algorithm;

calculating an observation weight value corresponding to the observation sample position, wherein the higher the observation weight value when the observation sample position is more similar to the target trajectory, and the lower the observation weight value when the observation sample position is more similar to the camouflage interference trajectory; and selecting the observation sample position having a highest observation weight value to be correlated with the prediction trajectory.

3. The image target tracking method according to claim 1, wherein the step of performing a robust estimation according to the clustering result in order to determine a relative position between a target and a camouflage interference in an image comprises:

performing a cluster dense sampling according to the clustering result, and extracting a gradient feature from the dense sampling;

matching the extracted gradient feature with a predetermined gradient model for obtaining a matching value;

obtaining a corresponding position of the gradient matching mean point and a corresponding position of the highest gradient matching value point; and performing a robust estimation according to the corresponding position of the gradient matching mean point and the corresponding position of the highest gradient matching value point in order to determine the relative position between the target and the camouflage interference in the image.

4. The image target tracking method according to claim 3, wherein the step of performing a robust estimation according to the corresponding position of the gradient matching mean point and the corresponding position of the highest gradient matching value point in order to determine the relative position between the target and the camouflage interference in the image comprises:

performing an iterative clustering and a potential target region estimation on dense sampling points within each cluster according to the corresponding position of the gradient matching mean point and the corresponding position of the highest gradient matching value point;

when an offset between the corresponding position of each gradient matching mean point and the corresponding position of each highest gradient matching value point is less than a predetermined value, stopping the iteration and searching a target having the overlapping region; and determining the relative position between the target and the camouflage interference in the image.

5. An image target tracking system, comprising:

a sparse sampling module, configured to obtain a target initial position, and perform a sparse sampling according to the target initial position;

a sampling point dividing module, configured to divide sampling points into foreground sampling points and background sampling points;

a clustering module, configured to cluster adjacent foreground sampling points according to a spatial distribution of the foreground sampling points in order to obtain a clustering result containing a plurality of clusters;

a position determining module, configured to perform a robust estimation according to the clustering result in order to determine a relative position between a target and a camouflage interference in an image; and a tracking module, configured to generate a prediction trajectory, correlate an observation sample position with the prediction trajectory to generate a correlation result, and determine whether the target is blocked and track the target according to the correlation result;

wherein the tracking module further comprises:

a prediction trajectory generating unit, configured to generate the prediction trajectory according to the relative position between the target and the camouflage interference in the image;

a correlating unit, configured to acquire an observation sample position in real time, and correlate the observation sample position with the prediction trajectory to generate a correlation result; and a tracking unit, configured to determine that the target is not blocked and confirm that the target is tracked If a first correlation coefficient between the observation sample position and the target is greater than a second correlation coefficient between the observation sample position and the camouflage interference; otherwise, the tracking unit is configured to determine that the target is blocked.

6. The image target tracking system according to claim 5, wherein the prediction trajectory comprises a target trajectory and a camouflage interference trajectory; and the correlation unit comprises:

a matching unit, configured to separately match the observation sample position with the target trajectory and the camouflage interference trajectory through a Bayesian probability algorithm;

an observation weight calculating unit, configured to calculate an observation weight value corresponding to the observation sample position, wherein the higher the observation weight value when the observation sample position is more similar to the target trajectory, and the lower the observation weight value when the observation sample position is more similar to the camouflage interference trajectory; and a correlation executing unit, configured to select the observation sample position having a highest observation weight value to be correlated with the prediction trajectory.

7. An image target tracking method, comprising:

obtaining a target initial position, and performing a sparse sampling according to the target initial position;

dividing sampling points into foreground sampling points and background sampling points;

clustering adjacent foreground sampling points according to a spatial distribution of the foreground sampling points in order to obtain a clustering result containing a plurality of clusters;

performing a robust estimation according to the clustering result in order to determine a relative position between a target and a camouflage interference in an image; and generating a prediction trajectory, correlating an observation sample position with the prediction trajectory to generate a correlation result, and determining whether the target is blocked and tracking the target according to the correlation result;

wherein the step of performing a robust estimation according to the clustering result in order to determine a relative position between a target and a camouflage interference in an image comprises:

performing a cluster dense sampling according to the clustering result, and extracting a gradient feature from the dense sampling;

matching the extracted gradient feature with a predetermined gradient model for obtaining a matching value;

obtaining a corresponding position of the gradient matching mean point and a corresponding position of the highest gradient matching value point; and performing a robust estimation according to the corresponding position of the gradient matching mean point and the corresponding position of the highest gradient matching value point in order to determine the relative position between the target and the camouflage interference in the image.

8. The image target tracking method according to claim 7, wherein the step of performing a robust estimation according to the corresponding position of the gradient matching mean point and the corresponding position of the highest gradient matching value point in order to determine the relative position between the target and the camouflage interference in the image comprises:

performing an iterative clustering and a potential target region estimation on dense sampling points within each cluster according to the corresponding position of the gradient matching mean point and the corresponding position of the highest gradient matching value point;

when an offset between the corresponding position of each gradient matching mean point and the corresponding position of each highest gradient matching value point is less than a predetermined value, stopping the iteration and searching a target having the overlapping region; and determining the relative position between the target and the camouflage interference in the image.

* * * * *